(12) United States Patent
Guest, Jr.

(10) Patent No.: US 9,771,972 B2
(45) Date of Patent: Sep. 26, 2017

(54) SELF-LEVELING THRUST BEARING RETAINER

(71) Applicant: Elliott Company, Jeannette, PA (US)

(72) Inventor: Neil A. Guest, Jr., North Huntingdon, PA (US)

(73) Assignee: Elliott Company, Jeannette, PA (US)

( * ) Notice: Subject to any disclaimer, the term of this patent is extended or adjusted under 35 U.S.C. 154(b) by 0 days.

(21) Appl. No.: 14/789,265

(22) Filed: Jul. 1, 2015

(65) Prior Publication Data
US 2017/0002857 A1    Jan. 5, 2017

(51) Int. Cl.
  *F16C 17/06*    (2006.01)
  *F16C 43/02*    (2006.01)
  *F16C 33/10*    (2006.01)

(52) U.S. Cl.
  CPC .......... *F16C 17/065* (2013.01); *F16C 33/108* (2013.01); *F16C 43/02* (2013.01); *Y10T 29/49696* (2015.01)

(58) Field of Classification Search
  CPC ........ F16C 17/03; F16C 17/06; F16C 33/108; F16C 37/002; F16C 23/048; F16C 32/666; Y10T 29/49645; Y10T 29/49696; F04D 29/04; Y10S 384/90
  USPC ........ 384/121, 308, 312, 368, 420, 916, 903
  See application file for complete search history.

(56) References Cited

U.S. PATENT DOCUMENTS

| | | |
|---|---|---|
| 1,441,614 A | 1/1923 | Wadsworth |
| 2,744,799 A | 5/1956 | Howarth |
| 3,201,184 A | 8/1965 | Hill |
| 3,259,441 A | 7/1966 | Newell |
| 3,814,487 A | 6/1974 | Gardner |
| 4,335,925 A | 6/1982 | Stopp |
| 4,456,391 A | 6/1984 | New |
| 4,568,204 A | 2/1986 | Chambers |
| 5,007,745 A * | 4/1991 | Ball .................. F16C 17/06 384/307 |
| 5,068,965 A | 12/1991 | Ball et al. |
| 5,288,153 A | 2/1994 | Gardner |
| 5,567,057 A | 10/1996 | Boller |
| 5,795,076 A | 8/1998 | Ball et al. |
| 5,879,085 A | 3/1999 | Ball et al. |
| 5,927,860 A | 7/1999 | Buse |
| 6,422,754 B1 | 7/2002 | Dong et al. |
| 6,565,257 B1 | 5/2003 | Kennedy et al. |
| 6,746,152 B2 | 6/2004 | Branagan |
| 7,237,957 B2 | 7/2007 | Geiger |

(Continued)

FOREIGN PATENT DOCUMENTS

| | | | |
|---|---|---|---|
| DE | 2409711 A1 * | 8/1974 | .............. F16C 17/06 |
| EP | 0420478 A2 * | 4/1991 | .............. F16C 17/06 |

(Continued)

*Primary Examiner* — Marcus Charles
(74) *Attorney, Agent, or Firm* — The Webb Law Firm

(57) ABSTRACT

A thrust bearing includes a bearing retainer including a first ring and a second ring radially spaced from the first ring, the first ring and the second ring defining an annular passageway therebetween, and at least two bearing pad retaining arrangements extending from a first surface of the second ring, each bearing pad retaining arrangement defining a retaining channel therein, and at least two bearing pads circumferentially spaced within the bearing retainer. The bearing pads may be held within the bearing retainer via the bearing pad arrangements.

17 Claims, 9 Drawing Sheets

(56) References Cited

U.S. PATENT DOCUMENTS

| | | | |
|---|---|---|---|
| 7,311,445 B2 | 12/2007 | New | |
| 7,328,681 B2 | 2/2008 | Tidwell | |
| 7,611,286 B2 * | 11/2009 | Swann | F16C 17/03 384/119 |
| 8,197,144 B2 * | 6/2012 | Shepherd | F16C 17/03 384/309 |
| 8,408,802 B2 | 4/2013 | Zeidan | |
| 8,439,134 B2 | 5/2013 | Vezirian | |
| 8,678,658 B2 * | 3/2014 | New | F16C 17/035 384/122 |
| 8,734,019 B2 * | 5/2014 | Palomba | F16C 43/02 384/117 |
| 2010/0260451 A1 | 10/2010 | Wilkes | |
| 2010/0310201 A1 | 12/2010 | Zeidan | |
| 2011/0019950 A1 | 1/2011 | Hirai et al. | |
| 2014/0102810 A1 | 4/2014 | Peterson et al. | |
| 2014/0105739 A1 | 4/2014 | Peterson et al. | |

FOREIGN PATENT DOCUMENTS

| | | | |
|---|---|---|---|
| JP | 03149411 A | * | 6/1991 |
| KR | 20030013507 A | * | 2/2003 |
| KR | 100748595 B1 | | 8/2007 |

* cited by examiner

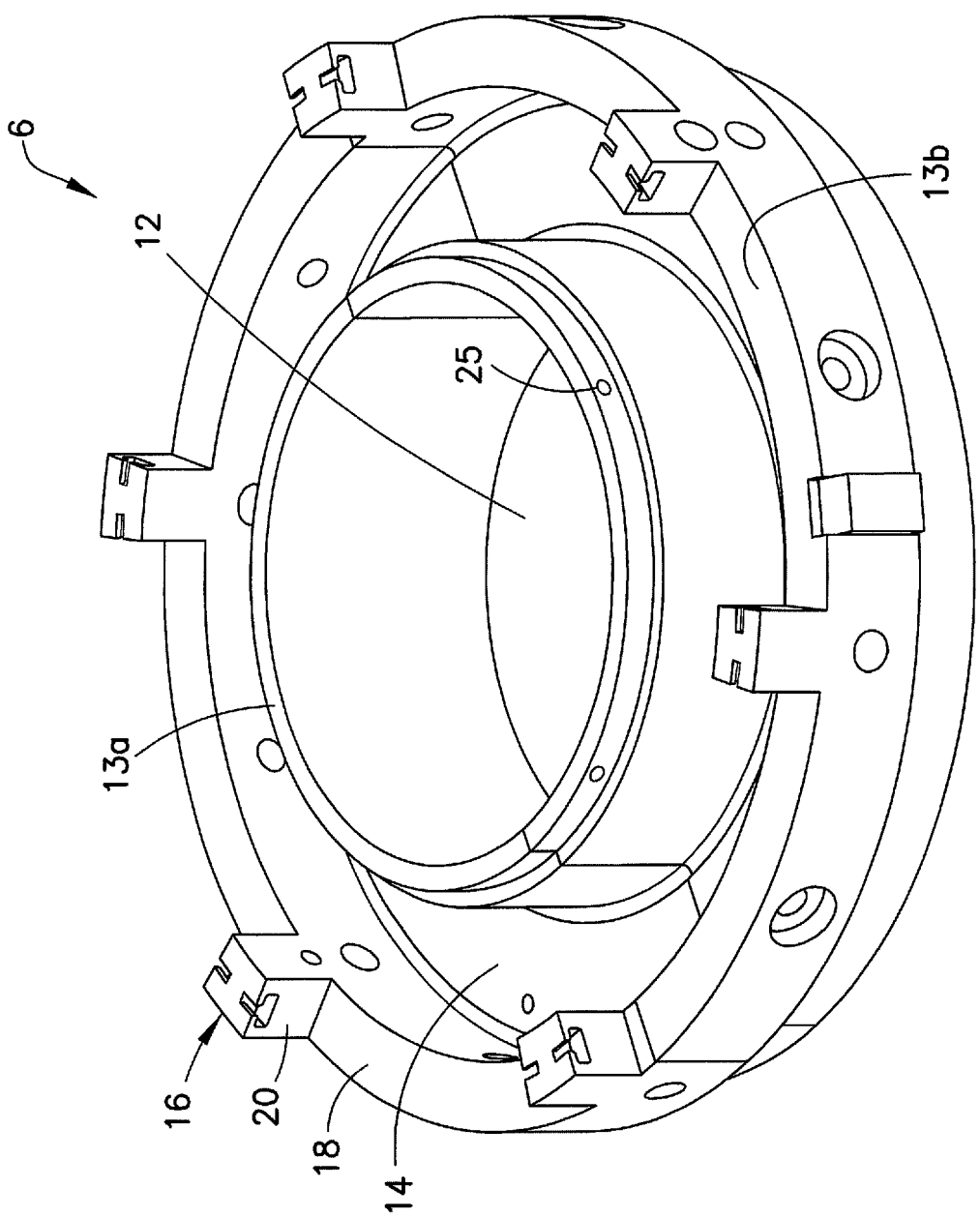

SELF-LEVELING THRUST BEARING RETAINER

BACKGROUND OF THE INVENTION

Field of the Invention

This disclosure relates generally to thrust bearings and, more particularly, to self-leveling thrust bearing retainers.

Description of Related Art

Rotational bearings are well known in the art to provide an interface between a rotating structure and a contact surface. It is often common to use a pad or plurality of pads at the interface between the rotating structure and contact surface to optimize the interconnection between the bearing and the rotating structure and to transmit any axial thrust forces.

Load capacity for the bearing is often highly dependent on the pad interface in the bearing. It has been discovered that the interface can be further optimized for better transmission of axial thrust forces by tilting the pads of a bearing to create a wedge of lubricating fluid between the bearing and the rotating structure. The increased load capacity by reduced friction is achieved by increasing fluid pressure in the narrow part of the wedge. Such tilting pad thrust bearing arrangements are well known in the art. Typically, such tilting pad arrangements include an array of pads that are permitted to tilt in either one direction or two directions in a given rotational direction, thereby creating the oil wedge.

In conventional thrust bearings, however, assembly of the pads within a retainer of the bearing assembly often proves difficult. Typical tilting pad thrust bearings have retainers that require complicated machining techniques with small parts that may become loose and injected into the machine that is being used with the thrust bearing. Typical retainers for thrust bearing arrangements include a dowel or pin that is inserted into each pad and, subsequently, the retainer to keep the pad held within the retainer during assembly. U.S. Pat. No. 5,288,153 to Gardner, which is incorporated herein by reference in its entirety, shows an example of a typical thrust bearing retainer arrangement. A dowel pin is inserted into the pads and the retainer to prevent the pads from being carried circumferentially by the rotating shaft. The pads in this thrust bearing retainer arrangement, however, are capable of falling out of the notches and into the machine that is being used with the thrust bearing, which can cause significant damage to the machine.

Therefore, there is a current need for a thrust bearing retainer that permits easy assembly and retention of pads within a thrust bearing. There is also a current need for a thrust bearing retainer that will hold the thrust bearing pads in place during assembly while allowing free movement of the pads during use of the thrust bearing in a machine.

SUMMARY OF THE INVENTION

Accordingly, and generally, a thrust bearing, a thrust bearing retainer, and a method of assembling a thrust bearing are provided to address and/or overcome some or all of the deficiencies or drawbacks associated with existing thrust bearing retainers.

In accordance with one aspect, a thrust bearing includes a bearing retainer including a first ring and a second ring radially spaced from the first ring, the first ring and the second ring defining an annular passageway therebetween, and at least two bearing pad retaining arrangements extending from a first surface of the second ring, each bearing pad retaining arrangement defining a retaining channel therein, and at least two bearing pads circumferentially spaced within the bearing retainer. The bearing pads may be held within the bearing retainer using the bearing pad arrangements.

Each bearing pad may include at least one retaining member provided in each side surface of the bearing pads. The retaining channel may include an insertion channel and a holding channel. The insertion channel may extend substantially perpendicularly to the holding channel. The at least one retaining member provided in each side surface of the bearing pads may be inserted into the insertion channel via an interference fit. The at least one retaining member provided in each side surface of the bearing pads may be held within the holding channel via a clearance fit. A diameter of the holding channel may be greater than a diameter of the at least one retaining member provided in each side surface of the bearing pads. The at least one retaining member may include a dowel pin. The at least one retaining member may include a spring-loaded dowel pin. The retaining channel may be formed as an inverted T-slot. At least one aperture may be defined in an outer circumferential surface of the first ring. Each bearing pad may include at least one retaining member provided in an inner surface of the bearing pad. The at least one retaining member provided in the inner surface of the bearing pad may be inserted into the at least one aperture defined in the outer circumferential surface of the first ring. A diameter of the at least one aperture defined in the outer circumferential surface of the first ring may be greater than a diameter of the at least one retaining member provided in the inner surface of the bearing pad. The at least one retaining member provided in the inner surface of the bearing pad may be inserted into the bearing pad via a friction fit.

In accordance with a further aspect, a thrust bearing retainer may include a first ring and a second ring radially spaced from the first ring, the first ring and the second ring defining an annular passageway therebetween, and at least two bearing pad retaining arrangements extending from a first surface of the second ring. Each bearing pad retaining arrangement may define a retaining channel therein. The retaining channel may be formed as an inverted T-slot. The retaining channel may include an insertion channel and a holding channel. The insertion channel may extend substantially perpendicularly to the holding channel. At least one aperture may be defined in an outer circumferential surface of the first ring.

In accordance with a further aspect, a method of assembling a thrust bearing may include the steps of inserting at least one retaining member in a first side surface and a second side surface of a bearing pad; and inserting the retaining members of each bearing pad into a corresponding bearing pad retaining arrangement extending from a first surface of a bearing retainer. The method may further include the step of inserting the retaining members of each bearing pad into each bearing pad retaining arrangement via an interference fit. The method may further include the steps of inserting an additional retaining member in an inner surface of each bearing pad; and inserting the additional retaining member into an aperture defined in a first ring of the bearing retainer.

These and other features and characteristics of a self-leveling thrust bearing, as well as the methods of manufacture and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

FIG. 5A is a top perspective view of the retainer of the self-leveling thrust bearing of FIG. 1A;

DESCRIPTION OF THE DISCLOSURE

Figure 1A:
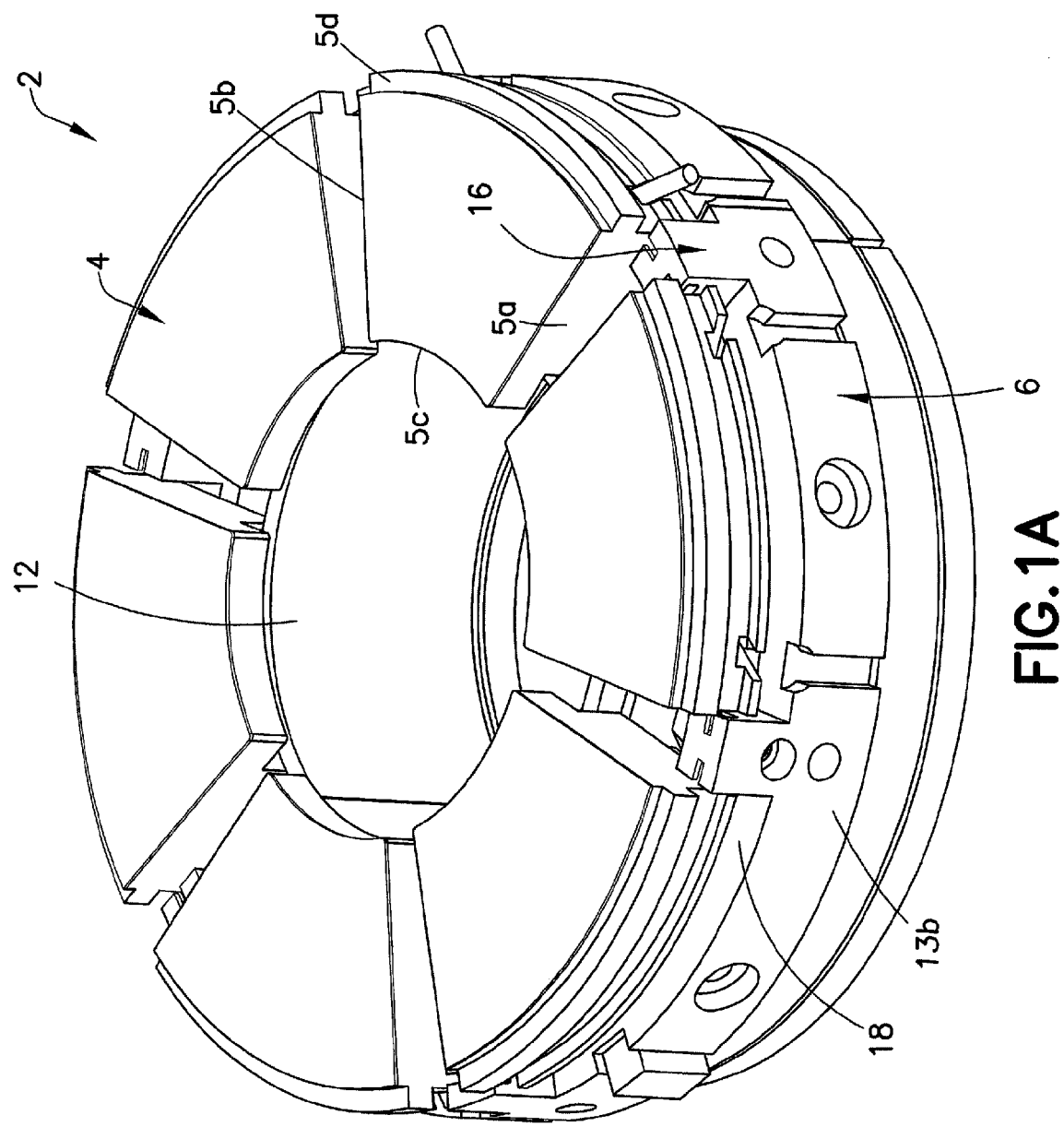
FIG. 1A is a top perspective view of a self-leveling thrust bearing according to one aspect of the disclosure.
Figure 1B:
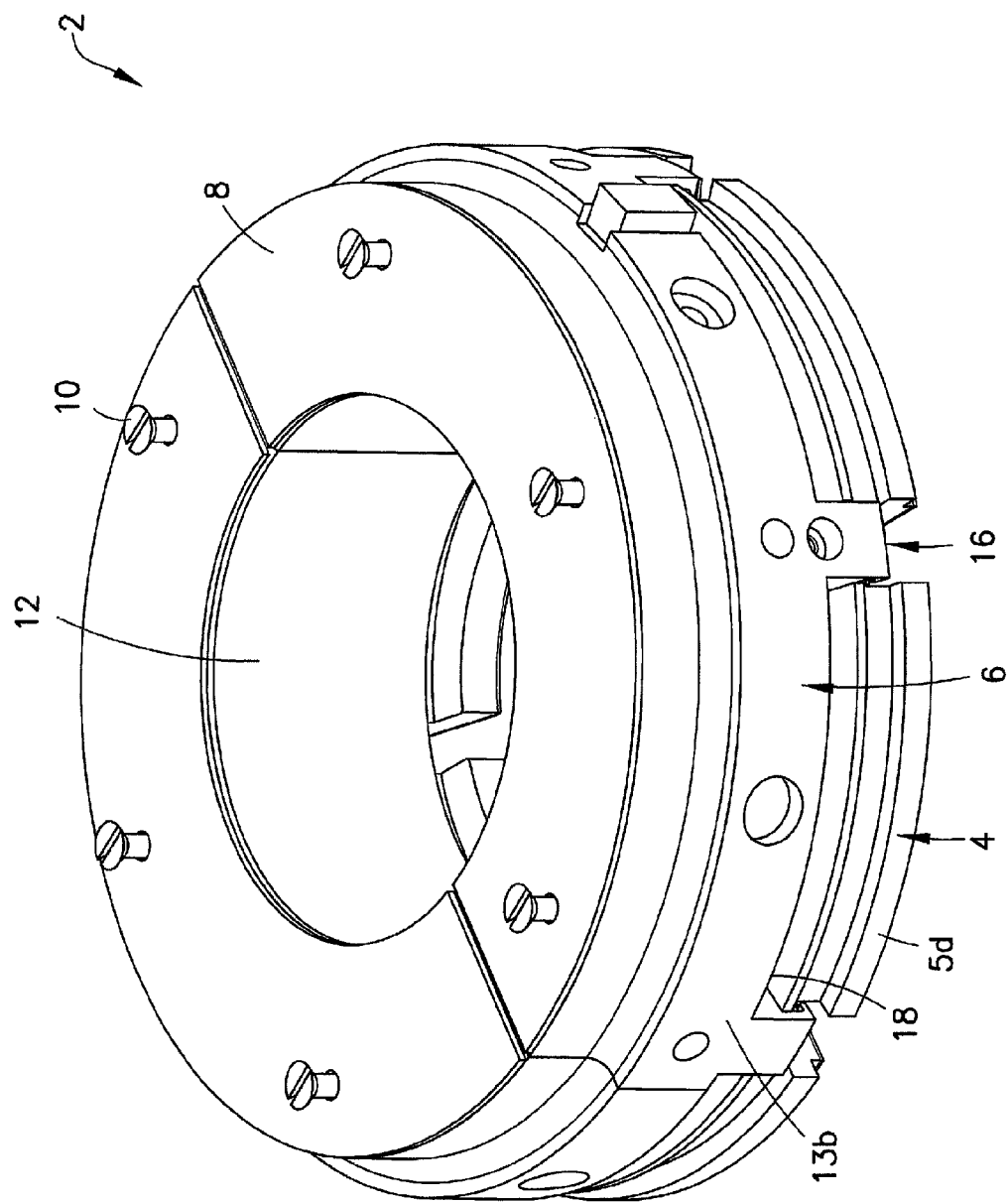
FIG. 1B is a bottom perspective view of the self-leveling thrust bearing of FIG. 1A.
Figure 2:
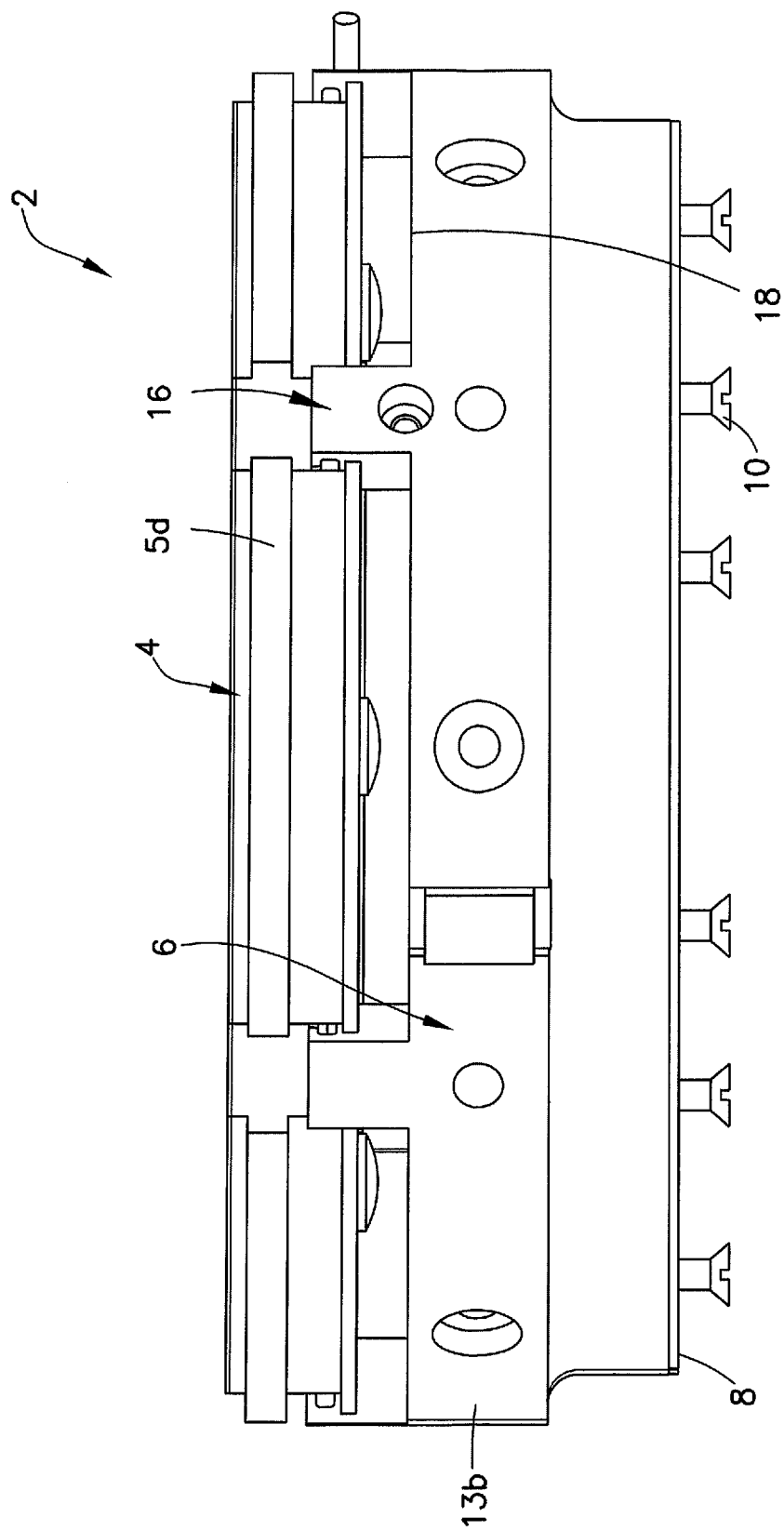
FIG. 2 is a side view of the self-leveling thrust bearing of FIG. 1A.
Figure 3:
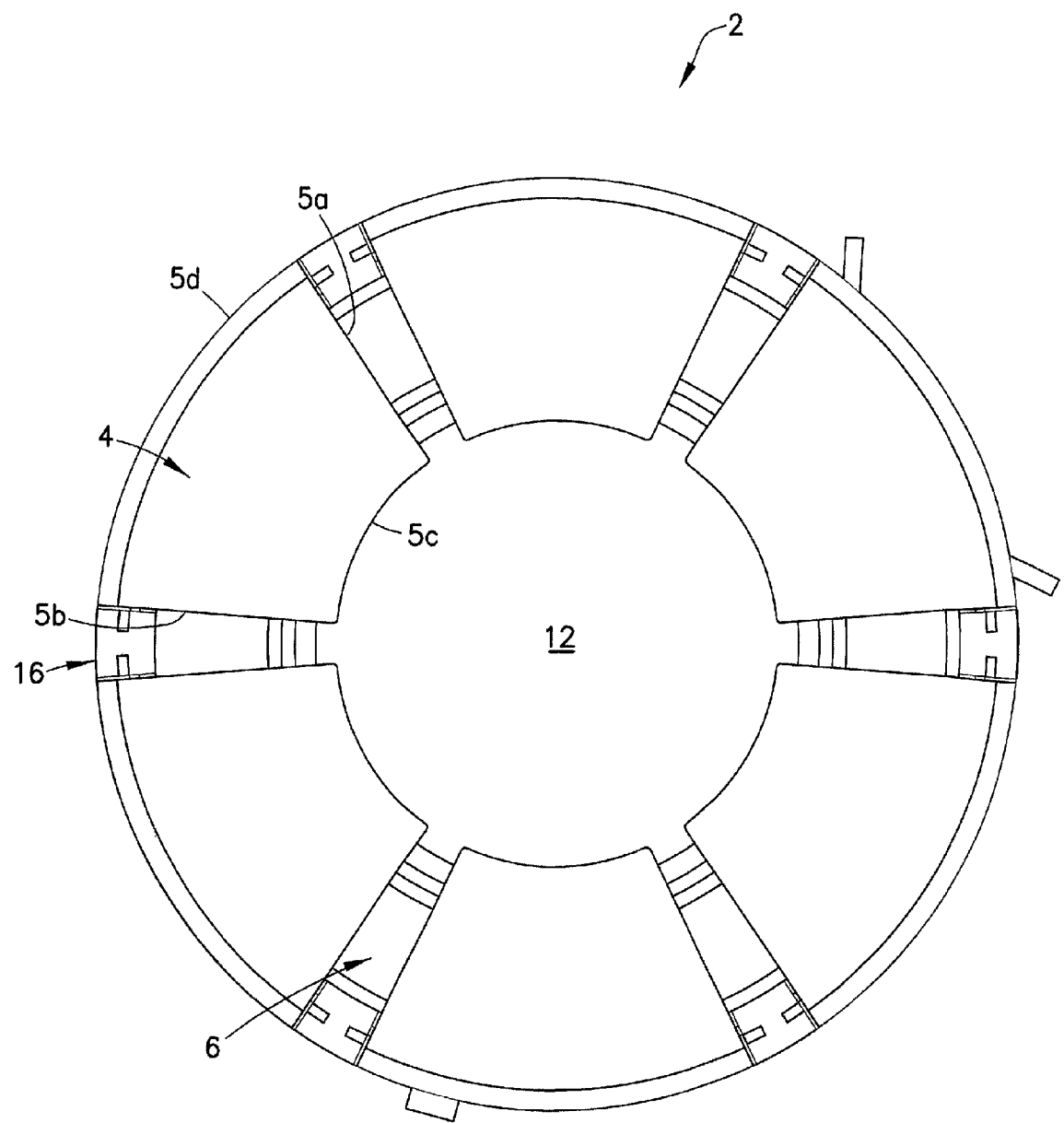
FIG. 3 is a top view of the self-leveling thrust bearing of FIG. 1A.
Figure 4:
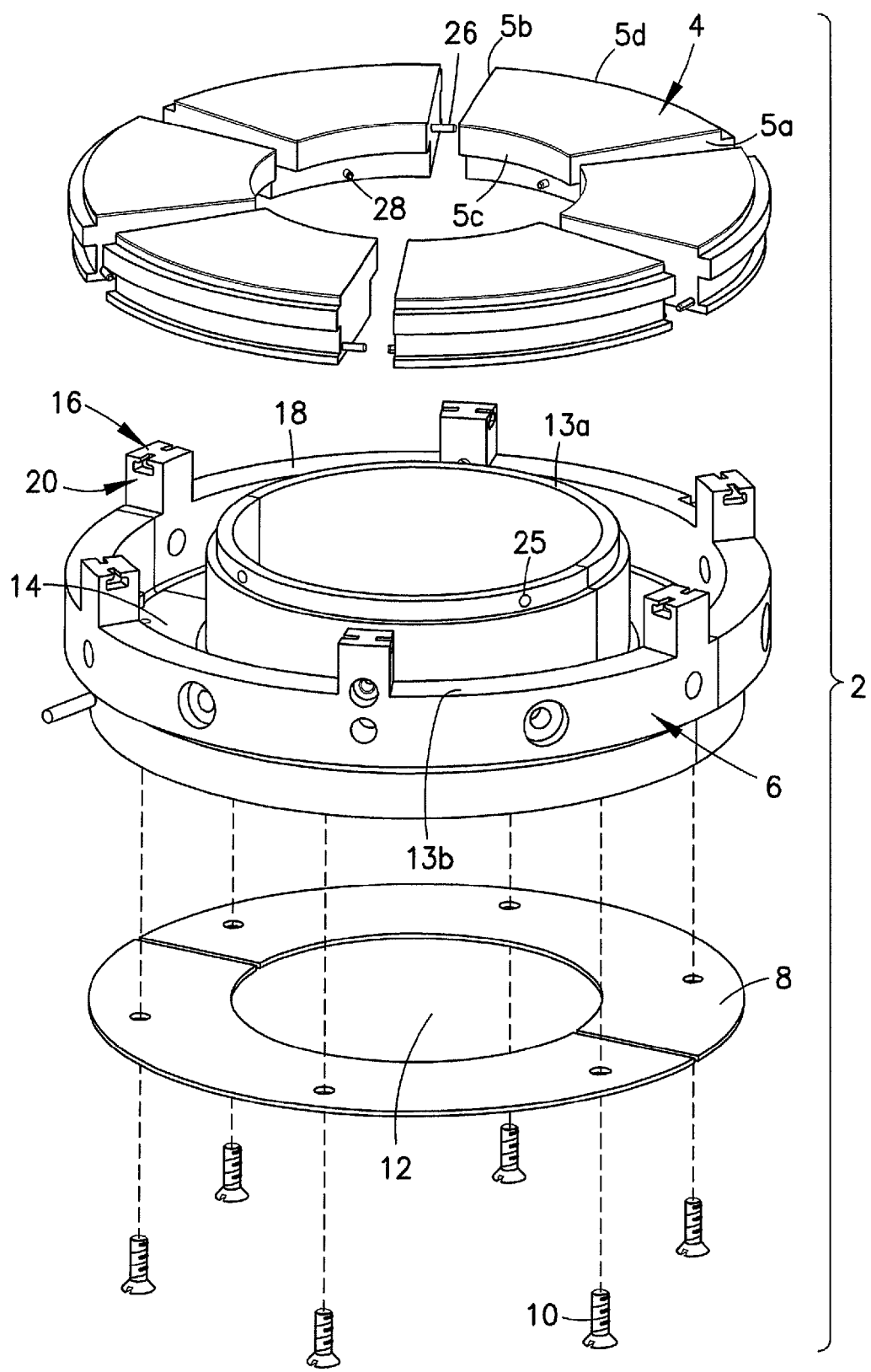
FIG. 4 is an assembly view of the self-leveling thrust bearing of FIG. 1A.

For purposes of the description hereinafter, the terms "upper", "lower"; "right", "left", "vertical", "horizontal", "top", "bottom", "lateral", "longitudinal", and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary aspects of the invention. Hence, specific dimensions and other physical characteristics related to the aspects disclosed herein are not to be considered as limiting.

The present disclosure is directed to, in general, a self-leveling thrust bearing and, in particular, to a self-leveling thrust bearing retainer. Certain preferred and non-limiting embodiments of the components of the thrust bearing are illustrated in FIGS. 1A-9.

Figure 6:
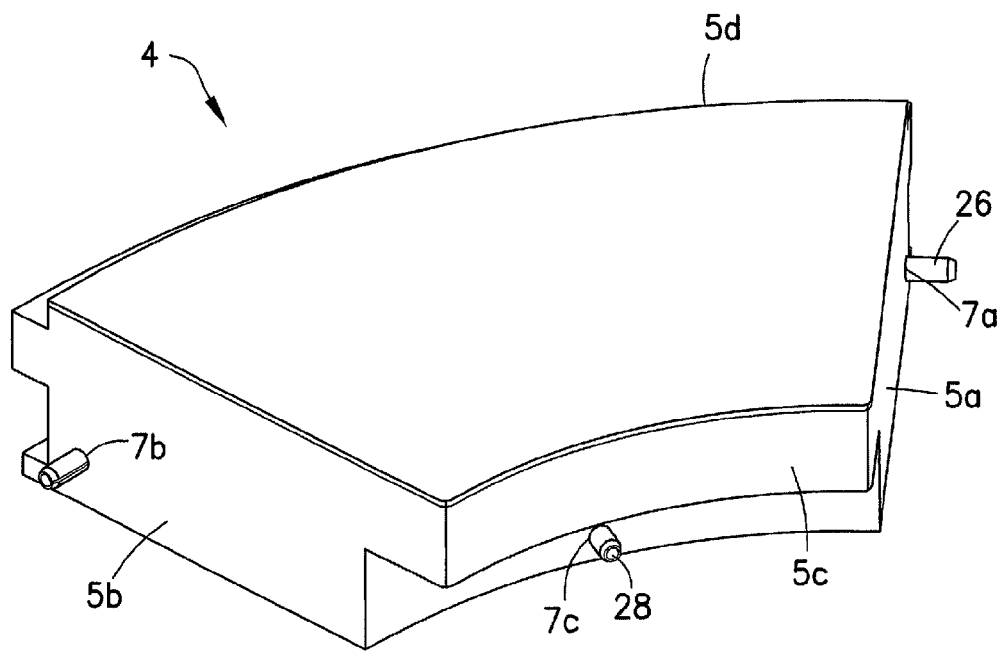
FIG. 6 is a top perspective view of a pad of the self-leveling thrust bearing of FIG. 1A.

With reference to FIGS. 1A-4, a self-leveling thrust bearing 2 (hereinafter "thrust bearing 2") is shown. Although the present disclosure is described in relation to a self-leveling thrust bearing 2, it is also contemplated that alternative types of thrust bearings may be used with the present disclosure. The thrust bearing 2 includes at least one bearing pad 4 that is held within a bearing retainer 6. In one aspect, an array of bearing pads 4 may be spaced circumferentially around the bearing retainer 6. In one aspect, six bearing pads 4 may be provided in the bearing retainer 6. Each bearing pad 4 may include two side surfaces 5a, 5b, an inner surface 5c, and an outer surface 5d (FIG. 6). A support plate 8 may be provided on a lower or bottom surface of the thrust bearing 2. The support plate 8 may be connected to the thrust bearing 2 using a plurality of fasteners 10, such as screws or bolts. In one aspect, the bearing retainer 6 and the support plate 8 may be circular in shape. The bearing retainer 6 and the support plate 8 may each be formed as one monolithic structure or, alternatively, may be provided as two separate pieces. The bearing retainer 6 may be provided in two separate halves, which are held together by the bearing pads 4 as described below or, alternatively, may be provided as a single monolithic structure. The support plate 8 may be provided in two separate halves, which are held together by the fasteners 10 to the bearing retainer 6 or, alternatively, may be provided as a single monolithic structure. The thrust bearing 2 may define a central passageway 12 to receive a rotating structure.

Figure 5B:
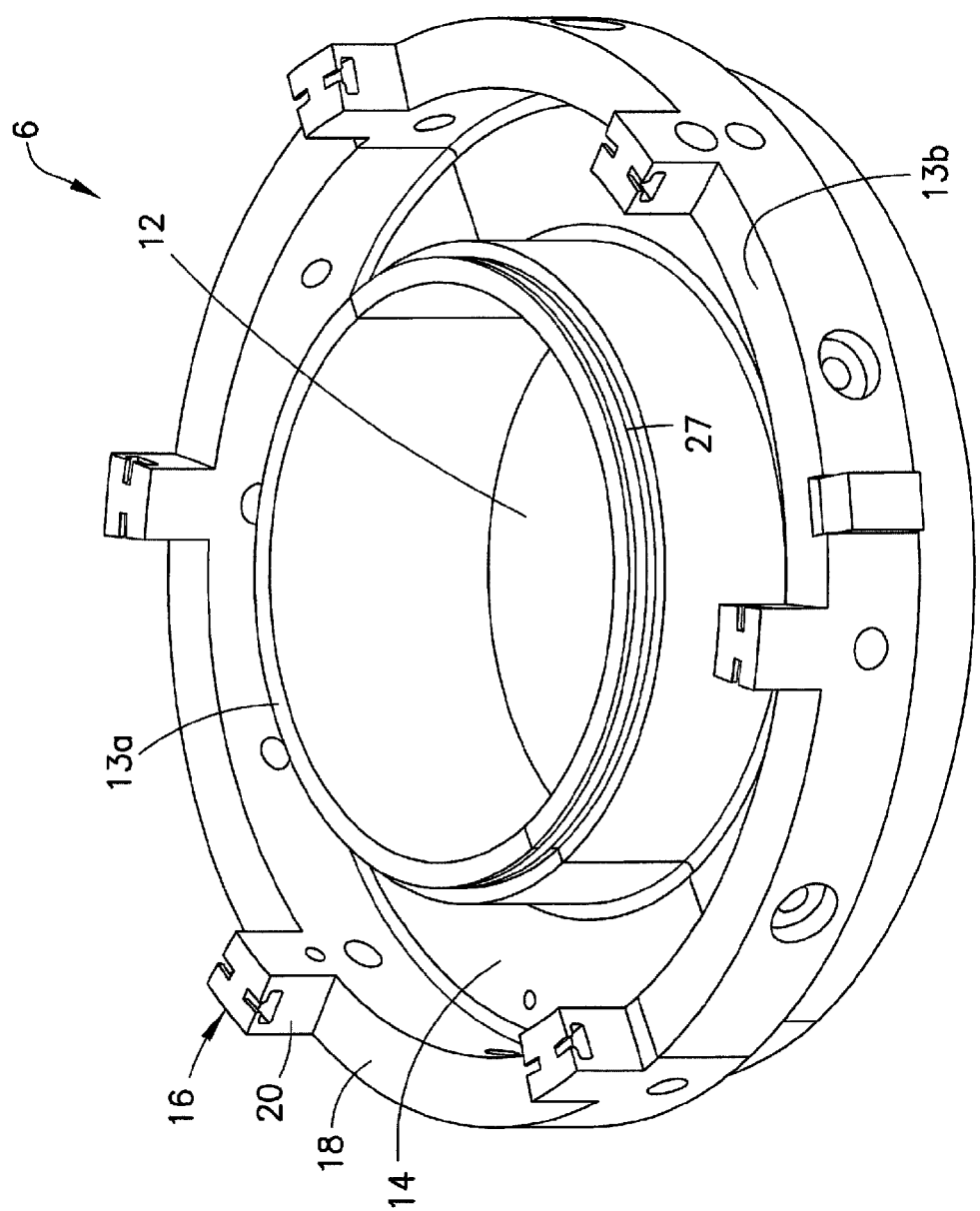
FIG. 5B is a top perspective view of another aspect of the retainer of the self-leveling thrust bearing.
Figure 8:
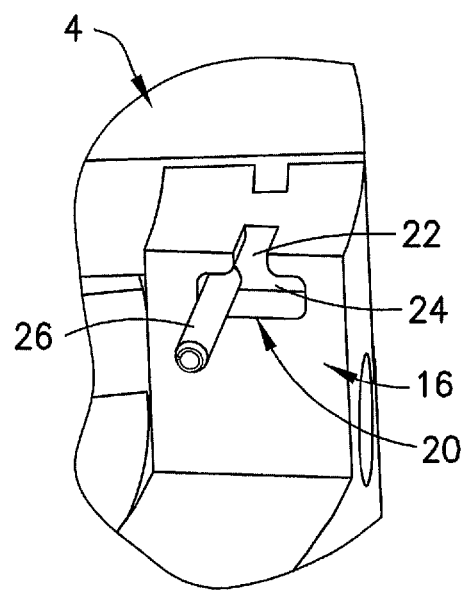
FIG. 8 is a side view of the pad retaining arrangement of FIG. 7.
Figure 9:
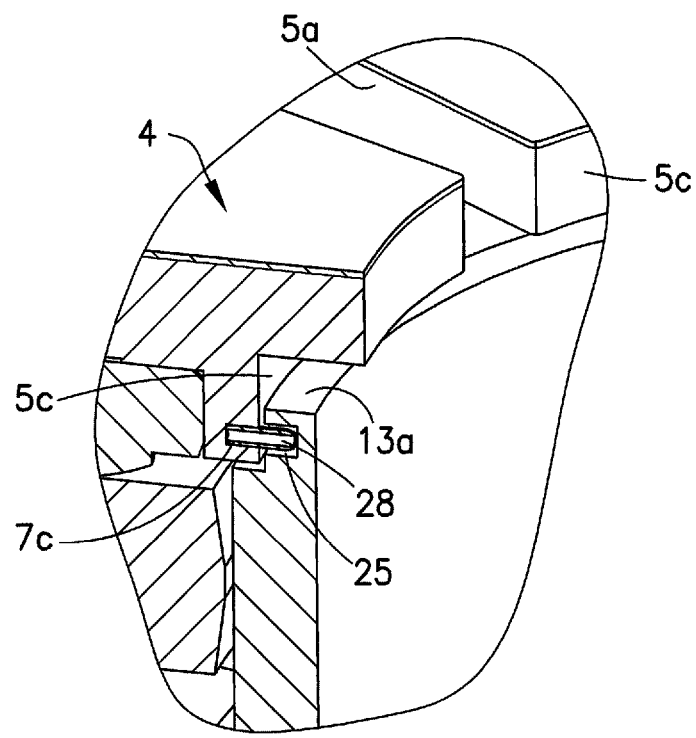
FIG. 9 is a side view of another pad retaining arrangement of the self-leveling thrust bearing of FIG. 1A.

With reference to FIG. 5A, the bearing retainer 6 may include a first or inner ring 13a and a second or outer ring 13b that define an annular passageway 14 configured to receive the bearing pads 4. The inner ring 13a and the outer ring 13b may be circular in shape. The outer ring 13b may have a greater diameter than the inner ring 13a. In one aspect, the bearing pads 4 are spaced annularly around the bearing retainer 6 above the annular passageway 14. After the thrust bearing 2 is assembled, the bearing pads 4 may be permitted to tilt slightly within the bearing retainer 6 thereby rotating into the annular passageway 14. In one aspect, a plurality of bearing pad retaining arrangements 16 may extend from a first or top surface 18 of the outer ring 13b. The bearing pad retaining arrangements 16 may be positioned annularly around the outer ring 13b of the bearing retainer 6. A left side surface and a right side surface may include a retaining channel 20 configured to receive a portion of the bearing pads 4, as will be described below. The retaining channel 20 may be formed or drilled into the bearing pad retaining arrangements 16 of the bearing retainer 6. As shown in FIG. 8, in one aspect, the retaining channel 20 may be formed as an inverted T-slot. The retaining channel 20 may include an insertion channel 22 and a holding channel 24. The insertion channel 22 may extend perpendicularly to the holding channel 24. As shown in FIGS. 5A and 9, the inner ring 13a may define an aperture 25 to also hold a portion of the bearing pad 4, as will be discussed below. The aperture 25 may be drilled into the inner ring 13a. In one aspect, a plurality of apertures 25 may be defined in an outer circumferential surface of the inner ring 13a. In another aspect, shown in FIG. 5B, the inner ring 13a may define a slot 27 that extends around the entire circumferential outer surface of the inner ring 13a. The slot 27 may extend 360 degrees around the inner ring 13a. A diameter of the slot 27 may be slightly greater than the diameter of a retaining member 28 provided in the bearing pad 4 to allow a loose fit within the slot 27. The slot 27 may be machined into the inner ring 13a, which may be used when a manufacturer is unable to drill the aperture 25 into the inner ring 13a and turning the inner ring 13a is a more applicable process.

With reference to FIG. 6, the bearing pad 4 of the thrust bearing 2 is shown. The bearing pads 4 may have a substantially trapezoidal shape. However, alternative shapes for the bearing pads 4 are contemplated according to the specific shape of the thrust bearing 2. The bearing pads 4 are configured to reduce friction between the thrust bearing 2 and the rotating structure that utilizes the thrust bearing 2. The bearing pads 4 may also include an additional layer or coating (not shown) provided thereon, which are dependent on the application and needs of the thrust bearing 2. In one aspect, both side surfaces 5a, 5b of the bearing pads 4 may define an aperture 7a, 7b to receive a retaining member 26. The aperture 7a, 7b may be drilled into the bearing pads 4. The inner surface 5c of the bearing pads 4 may also define an aperture 7c to receive another retaining member 28. In one aspect, the bearing pads 4 may only include the side retaining members 26. In another aspect, the bearing pads 4 may include both retaining members 26, 28 to hold the bearing pads 4 in the bearing retainer 6. The retaining members 26, 28 may be held within the apertures 7a-7c of the bearing pad 4 via a friction fit. Alternatively, the retaining members 26, 28 may be integrally formed with the bearing pads 4. It is also contemplated that the retaining members 26, 28 may be adhesively attached to or welded on to the bearing pads 4. In one aspect, the retaining members 26, 28 may be dowel pins or any other suitable pin type member that can be inserted into the apertures defined in the bearing pad 4. In a further aspect, the retaining members 26, 28 may be spring-loaded dowel pins that are configured to compress upon pressure being applied to the retaining members 26, 28. The retaining members 26, 28 may be cylindrical in shape. However, it is also contemplated that alternative shapes may be used for the retaining members 26, 28. The cross-sectional shape of the retaining members 26, 28 may substantially correspond to the cross-sectional shape of the apertures 7a-7c defined in the bearing pads 4.

Figure 7:
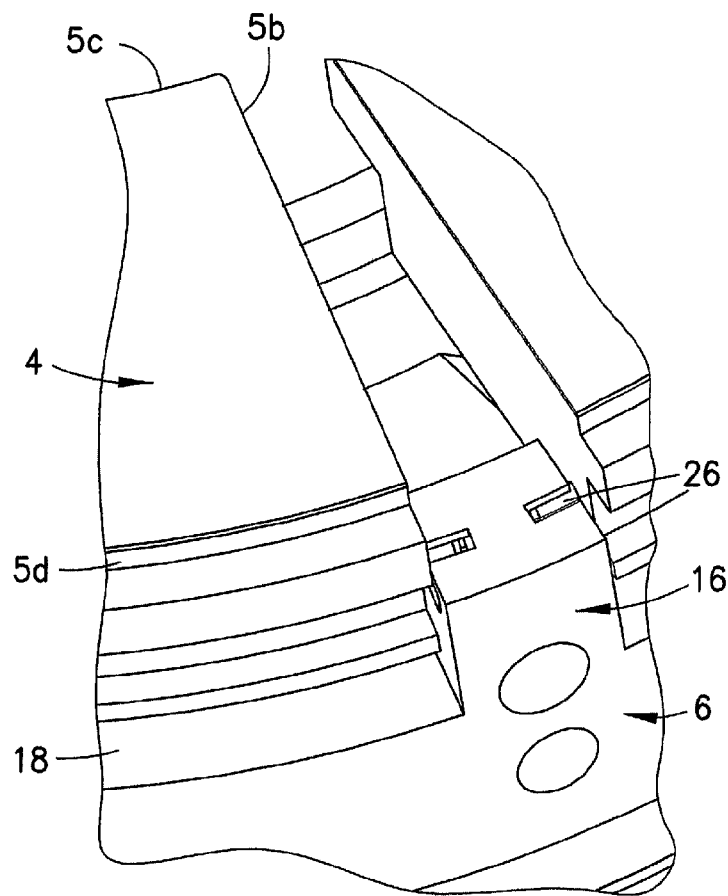
FIG. 7 is a partial perspective view of a pad retaining arrangement in the self-leveling thrust bearing of FIG. 1A.

With reference to FIGS. 7-9, a method of assembling the thrust bearing 2 is described. The apertures 7a-7c are initially drilled into the bearing pads 4. The apertures 7a-7c may be drilled into each side surface 5a, 5b and the inner surface 5c of each bearing pad 4. Thereafter, the retaining members 26 may be inserted into the apertures 7a, 7b defined in the side surfaces 5a, 5b of the bearing pad 4 and the retaining member 28 may be inserted into the aperture 7c defined in the inner surface 5c of the bearing pad 4. The retaining members 26, 28 may be held within the apertures 7a-7c of the bearing pad 4 using a friction fit, adhesive, or welding. In an aspect in which the retaining member 28 is provided with the bearing pads 4, an individual may then angle the bearing pads 4 to insert the retaining member 28 into the aperture 25 defined in the inner ring 13a of the bearing retainer 6 during assembly of the thrust bearing 2. The retaining member 28 may be inserted into the aperture 25 to assist in retaining the bearing pads 4 in the bearing retainer 6. In one aspect, the diameter of the aperture 25 may be slightly larger than the diameter of the retaining member 28 to permit a clearance fit within the aperture 25. During use of the thrust bearing 2, the retaining member 28 may be configured to not touch the inner surfaces of the aperture 25. Since the bearing pads 4 are configured to self-level within the bearing retainer 6, the retaining member 28 should preferably only touch the inner surfaces of the aperture 25 upon a significant rotation of the bearing pads 4.

After the retaining member 28 has been inserted into the aperture 25 defined in the inner ring 13a, the bearing pad 4 is rotated relative to the bearing retainer 6 to bring the retaining members 26 into contact with the bearing pad retaining arrangements 16 extending from the outer ring 13b. The retaining members 26 are positioned above the retaining channel 20 by the individual to allow insertion of the retaining members 26 into the retaining channel 20. The retaining members 26 are first inserted into the insertion channel 22. In one aspect, the retaining members 26 may be inserted into the insertion channel 22 via an interference fit. Therefore, a sufficient amount of force must be applied to the bearing pads 4 to push the retaining members 26 past the interference fit in the insertion channel 22. After the retaining members 26 have been inserted past the interference fit, the retaining members 26 may be prevented from falling out of the retaining channel 20 via the insertion channel 22. The interference fit may be configured to retain the retaining members 26 within the retaining channel 20 until a sufficient amount of force is applied to the bearing pads 4 to pull the retaining members 26 out of the retaining channel 20 past the interference fit.

Once the retaining members 26 have been inserted in the insertion channel 22 past the interference fit, the retaining members 26 are moved into the holding channel 24. Once positioned in the holding channel 24, the retaining members 26 are permitted to move in a lateral direction relative to the axis of rotation of the thrust bearing 2. In one aspect, the diameter of the holding channel 24 may be larger than the diameter of the retaining members 26 so that the retaining members 26 do not contact the surfaces of the holding channel 24 during use of the thrust bearing 2. It is also contemplated that, during an inadvertent rotation of the bearing pads 4, the retaining members 26 may contact the surfaces of the holding channel 24. During assembly of the thrust bearing 2, the retaining members 26 are permitted to move within the holding channel 24. In particular, the retaining members 26 may move to an inner portion of the holding channel 24 that is provided at an inner location of the outer ring 13b relative to the insertion channel 22, while the retaining members 26 may also move to an outer portion of the holding channel 24 that is provided at an outer location of the thrust bearing 2 relative to the insertion channel 22. By permitting the retaining members 26 throughout the holding channel 24, more flexibility is provided for inserting the bearing pads 4 into the bearing retainer 6. This feature also assists in keeping the bearing pads 4 in position during assembly of the thrust bearing 2.

The thrust bearing 2 described herein may be more easily assembled compared to conventional thrust bearings. As is often the case in conventional thrust bearings, the bearing pads are typically difficult to insert into the thrust bearing without misaligning or dropping a bearing pad during assembly of the thrust bearing. In some instances, conventional thrust bearings do not use a retainer to hold the bearing pads during installation. In certain circumstances, the thrust bearings are assembled at highly elevated positions, which can cause dangerous situations when a bearing pad is dropped during installation of the thrust bearing and the bearing pad 4 falls from the elevated height towards individuals standing below. By using the thrust bearing 2 described above, individuals and operators may more easily and efficiently install the bearing pads 4 into the bearing retainer 6. The described arrangement is particularly useful when the bearing pads 4 need to be installed vertically within the bearing retainer 6. The retaining members 26, 28 may assist in retaining the bearing pads 4 within the bearing retainer 6 during installation, so that the bearing pads 4 do not fall out of the bearing retainer 6 when the thrust bearing 2 is moved to a vertical position. Another advantageous feature of the thrust bearing 2 described above is the ability of the bearing retainer 6 to hold and retain the retaining members 26, 28 within the bearing retainer 6 in the event the retaining members 26, 28 fall out of or are dislodged from the apertures 7a-7c or holding channels 24. In conventional thrust bearings, once the retaining members are dislocated or dislodged, the retaining members are free to fall into the machine that is being used with the thrust bearing. The retaining members may fall into the machine and cause significant damage requiring replacement of parts within the machine or repairs that can slow down production times. Using the thrust bearing 2 described above, in the event the retaining members 26, 28 are dislodged or dislocated, the retaining members 26, 28 may be held within the aperture 25 or retaining channel 20 so that the retaining members 26, 28 do not fall down into the machine. Therefore, the present thrust bearing 2 improves the safety of use of the thrust bearing 2 as well as reduces any potential repair or replacement costs that are typically incurred when using conventional thrust bearings.

While various aspects of the disclosed thrust bearing were provided in the foregoing description, those skilled in the art may make modifications and alterations to these aspects without departing from the scope and spirit of the invention. For example, it is to be understood that this disclosure contemplates that, to the extent possible, one or more features of any aspect can be combined with one or more features of any other aspect. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. A thrust bearing, comprising:
   a bearing retainer comprising:
      a first ring and a second ring radially spaced from the first ring, the first ring and the second ring defining an annular passageway therebetween; and
      at least two bearing pad retaining arrangements extending from an uppermost surface of the second ring, each bearing pad retaining arrangement defining a retaining channel therein; and
   at least two bearing pads circumferentially spaced within the bearing retainer,
   wherein the bearing pads are held within the bearing retainer using the bearing pad retaining arrangements.

2. The thrust bearing as claimed in claim 1, wherein each bearing pad comprises at least one retaining member provided in each side surface of the bearing pad.

3. The thrust bearing as claimed in claim 2, wherein the at least one retaining member comprises a dowel pin.

4. The thrust bearing as claimed in claim 3, wherein the at least one retaining member comprises a spring-loaded dowel pin.

5. The thrust bearing as claimed in claim 1, wherein the retaining channel comprises:
   an insertion channel; and
   a holding channel,
   wherein the insertion channel extends substantially perpendicularly to the holding channel.

6. The thrust bearing as claimed in claim 5, wherein at least one retaining member provided in each side surface of the bearing pads is inserted into the insertion channel via an interference fit.

7. The thrust bearing as claimed in claim 5, wherein at least one retaining member provided in each side surface of the bearing pads is held within the holding channel via a clearance fit.

8. The thrust bearing as claimed in claim 5, wherein a diameter of the holding channel is greater than a diameter of at least one retaining member provided in each side surface of the bearing pads.

9. The thrust bearing as claimed in claim 1, wherein the retaining channel is formed as an inverted T-slot.

10. The thrust bearing as claimed in claim 1, wherein at least one aperture is defined in an outer circumferential surface of the first ring.

11. The thrust bearing as claimed in claim 10, wherein each bearing pad comprises at least one retaining member provided in an inner surface of the bearing pad, and
   wherein the at least one retaining member provided in the inner surface of the bearing pad is inserted into the at least one aperture defined in the outer circumferential surface of the first ring.

12. The thrust bearing as claimed in claim 11, wherein a diameter of the at least one aperture defined in the outer circumferential surface of the first ring is greater than a diameter of the at least one retaining member provided in the inner surface of the bearing pad.

13. The thrust bearing as claimed in claim 11, wherein the at least one retaining member provided in the inner surface of the bearing pad is inserted into the bearing pad via a friction fit.

14. A thrust bearing retainer, comprising:
   a first ring and a second ring radially spaced from the first ring, the first ring and the second ring defining an annular passageway therebetween; and
   at least two bearing pad retaining arrangements extending from an uppermost surface of the second ring, each bearing pad retaining arrangement defining a retaining channel therein.

15. The thrust bearing retainer as claimed in claim 14, wherein the retaining channel is formed as an inverted T-slot.

16. The thrust bearing retainer as claimed in claim 14, wherein the retaining channel comprises:
   an insertion channel; and
   a holding channel,
   wherein the insertion channel extends substantially perpendicularly to the holding channel.

17. The thrust bearing retainer as claimed in claim 14, wherein at least one aperture is defined in an outer circumferential surface of the first ring.

* * * * *